(12) United States Patent
Harada et al.

(10) Patent No.: US 6,934,516 B2
(45) Date of Patent: *Aug. 23, 2005

(54) RADIO NETWORK SYSTEM

(75) Inventors: Tomoyuki Harada, Hitachi (JP);
Takuji Hamada, Hitachioota (JP);
Hideaki Masuko, Hitachi (JP);
Shinichi Hanada, Hitachi (JP);
Yoshiaki Adachi, Hitachioota (JP);
Hisao Ogawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/454,634

(22) Filed: Jun. 5, 2003

(65) Prior Publication Data

US 2003/0194972 A1 Oct. 16, 2003

Related U.S. Application Data

(63) Continuation of application No. 09/660,170, filed on Sep. 12, 2000, now Pat. No. 6,625,421.

(30) Foreign Application Priority Data

Sep. 14, 1999 (JP) .......................................... 11-259728

(51) Int. Cl.$^7$ ................................................ H04B 7/00
(52) U.S. Cl. ...................... 455/69; 455/502; 455/452.1; 455/452.2
(58) Field of Search ...................... 455/69, 502, 552.1, 455/553.1, 452.1, 452.2, 515, 524, 67.11, 450, 453; 370/350, 324, 428–429, 507, 509

(56) References Cited

U.S. PATENT DOCUMENTS

| | | | |
|---|---|---|---|
| 6,028,851 A | 2/2000 | Persson et al. | 370/329 |
| 6,078,568 A | 6/2000 | Wright et al. | 370/312 |
| 6,256,509 B1 | 7/2001 | Tanaka et al. | 455/515 |
| 6,381,445 B1 | 4/2002 | Ue et al. | 455/69 |
| 6,389,034 B1 | 5/2002 | Guo et al. | 370/441 |
| 6,426,971 B1 | 7/2002 | Wu et al. | 375/227 |
| 6,487,394 B1 | 11/2002 | Ue et al. | 455/69 |
| 6,505,035 B2 | 1/2003 | Ue et al. | 455/69 |

Primary Examiner—Sonny Trinh
(74) Attorney, Agent, or Firm—Kenyon & Kenyon

(57) ABSTRACT

Occurrence of significant difference of transmission rate between communication zones can be prevented to maintain the transmission rate of overall network uniform. The radio network system includes a plurality of radio communication control units are connected with each other via radio main line, and each radio communication control unit has a communication function with at least one radio communication terminal arranged within own communication area. Each of the radio communication control units includes means for broadcasting a transmission rate restriction demand to all of other radio communication control units and all of radio communication terminals when data amount stored in a transmission and reception buffer exceeds a predetermined threshold value, and means for lowering a transmission rate when a transmission rate restriction demand is received from any other radio communication control unit within a predetermined period and for increasing the transmission rate when no transmission rate restriction demand is received from any other radio communication control unit.

35 Claims, 5 Drawing Sheets

RADIO NETWORK SYSTEM

This is a continuation of application Ser. No. 09/660,170 filed on 12 Sep. 2000 now U.S. Pat. No. 6,625,421, the content of which is incorporated herein by reference in its entirety.

BACKGROUND OF THE INVENTION

The present invention relates to a radio network system, in which a plurality of radio communication control equipments respectively having communication function with a plurality of radio terminals and connected with each other via a radio main line.

In the recent years, according to advancement of radio communication technology, it has been frequently established a radio communication network for data transmission between terminals since it does not require engineering work for cable connection associated with modification of layout in an office, a store, a factory or the like. However, in order to perform communication in wide area, a main line of the network is constructed as a wired network with an optical fiber, coaxial cable or so forth so as to provide sufficient reliability. Such wired main line is connected to a communication control apparatus. Then, a plurality of radio communication terminals are typically connected to the communication control apparatus in tree connection, bus connection, star connection. As such type of network, it has been known a BREEZNET PROSeries of BREEZECOM Ltd.

It has been desired to form the main line of the network as radio communication line for reducing cabling cost, maintenance cost and so forth. However, when radio network is employed as main line, zones where retransmission process is frequently required for interference of reflected radio wave from ceiling, wall or so forth, environmental noise or so forth, to cause significant fluctuation of transmission rate between communication zones.

When a condition where transmission rate is significantly differentiated between communication zones, occurs, non-processed data may be accumulated in a transmission and reception buffer for relaying of the radio communication control unit of the zone where the transmission rate is lowered. Finally, significant delay of transmission or packet loss is caused to cause interruption of service of the network.

SUMMARY OF THE INVENTION

The present invention has been worked out in view of the problem in the prior art as set forth above. It is, therefore, an object of the present invention to prevent occurrence of significant difference of transmission rate between communication zones, and whereby to maintain the transmission rate of overall network constant.

According to one aspect of the present invention, a radio network system, in which a plurality of radio communication control units are connected with each other via radio main line, and each radio communication control unit has a communication function with at least one radio communication terminal arranged within own communication area, each of the radio communication control units comprises:

means for broadcasting a transmission rate restriction demand to all of other radio communication control units and all of radio communication terminals when data amount stored in a transmission and reception buffer exceeds a predetermined threshold value; and means for lowering a transmission rate when a transmission rate restriction demand is received from any other radio communication control unit within a predetermined period and for increasing the transmission rate when no transmission rate restriction demand is received from any other radio communication control unit.

By this, the transmission rate can be maintained uniform over the entire radio network to prevent occurrence of packet loss and to improve throughput.

In the preferred construction, each of the radio communication control units and the radio communication terminal may modify a time interval of reading the transmission and reception buffer for increasing and decreasing the transmission rate.

By this, data transmission rate can be varied simply without requiring complicate control, such as that varying transmission pulse width.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DETAILED DESCRIPTION OF THE PREFERRED EMBODIMENTS

The present invention will be discussed hereinafter in detail in terms of the preferred embodiment of a radio network system of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 2:
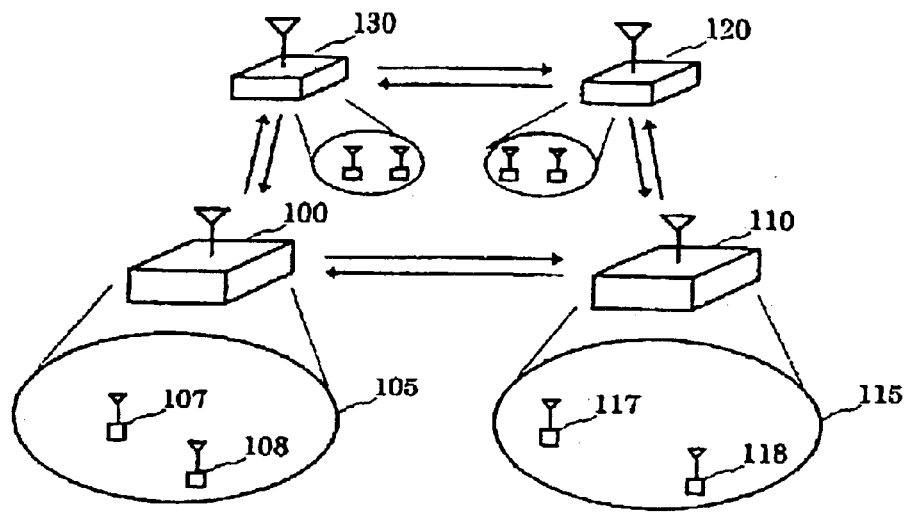
FIG. 2 is a diagrammatic illustration showing an example of a ring type radio network construction, to which the present invention is applied.

FIG. 2 shows a general construction of a radio network system, to which the present invention is applied. Here, discussion will be given in terms of a ring-shaped radio network system.

Radio communication control units 100, 110, 120 and 130 form a ring-shaped radio network system. For each of the radio communication control units 100, 110, 120 and 130, unique address is assigned. Also, unique addresses are assigned for radio communication terminals 107, 108, 117 and 118. The address may be assigned upon establishing the communication system, or, in the alternative, may be assigned dynamically upon communication.

The radio communication control unit 100 communicates with the radio communication terminals 107 and 108 located in a communication area 105. On the other hand, the radio communication control unit 110 communicates with the radio communication terminals 117 and 118 located in a communication area 115. Similarly, the radio communication control units 120 and 130 also communicate with radio terminals located in respective communication areas.

Figure 6:
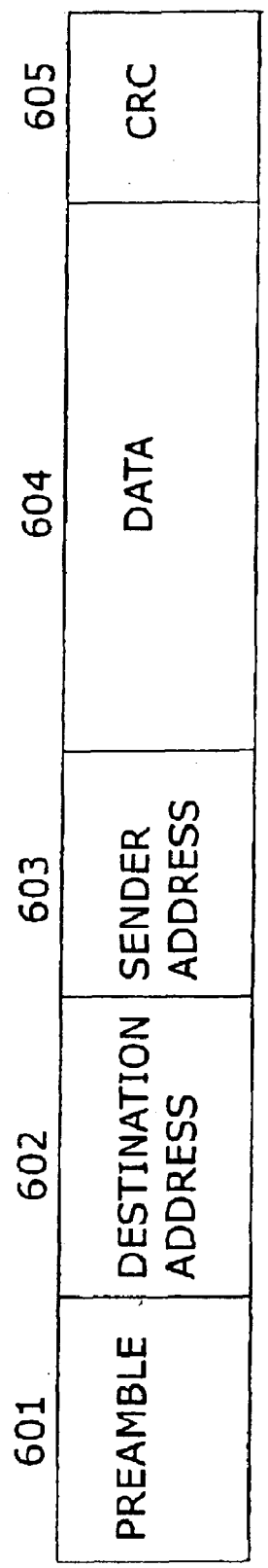
FIG. 6 is an illustration showing a frame format of a transmission data.

For example, when the radio communication terminal 107 transmits data to the radio communication terminal 118, the radio communication terminal 107, at first, transmits data to the radio communication control unit 100. The radio communication control unit 100 is normally set for transmitting data through the shortest route. Thus, data is transmitted from the radio communication control unit 100 to the radio communication control unit 110. Next, data is transferred from the radio communication control unit 110 to the radio communication terminal 118. An example of a frame format of a transmission data is shown in FIG. 6. The frame is a data of fixed length consisted of a preamble 601 as synchronization signal, a destination address 602, a sender address 603, a transmission data 604 and an error check signal CRC605. Upon transmission of data, the radio communication terminal stores the address of the radio communication terminal or the radio communication control unit as destination in the destination address 602 and stores own address in the sender address 603. Broadcasting transmission for all of the radio communication terminals and the radio communication control units is performed by writing a predetermined value, such as −1, in the destination address 602.

Figure 1:
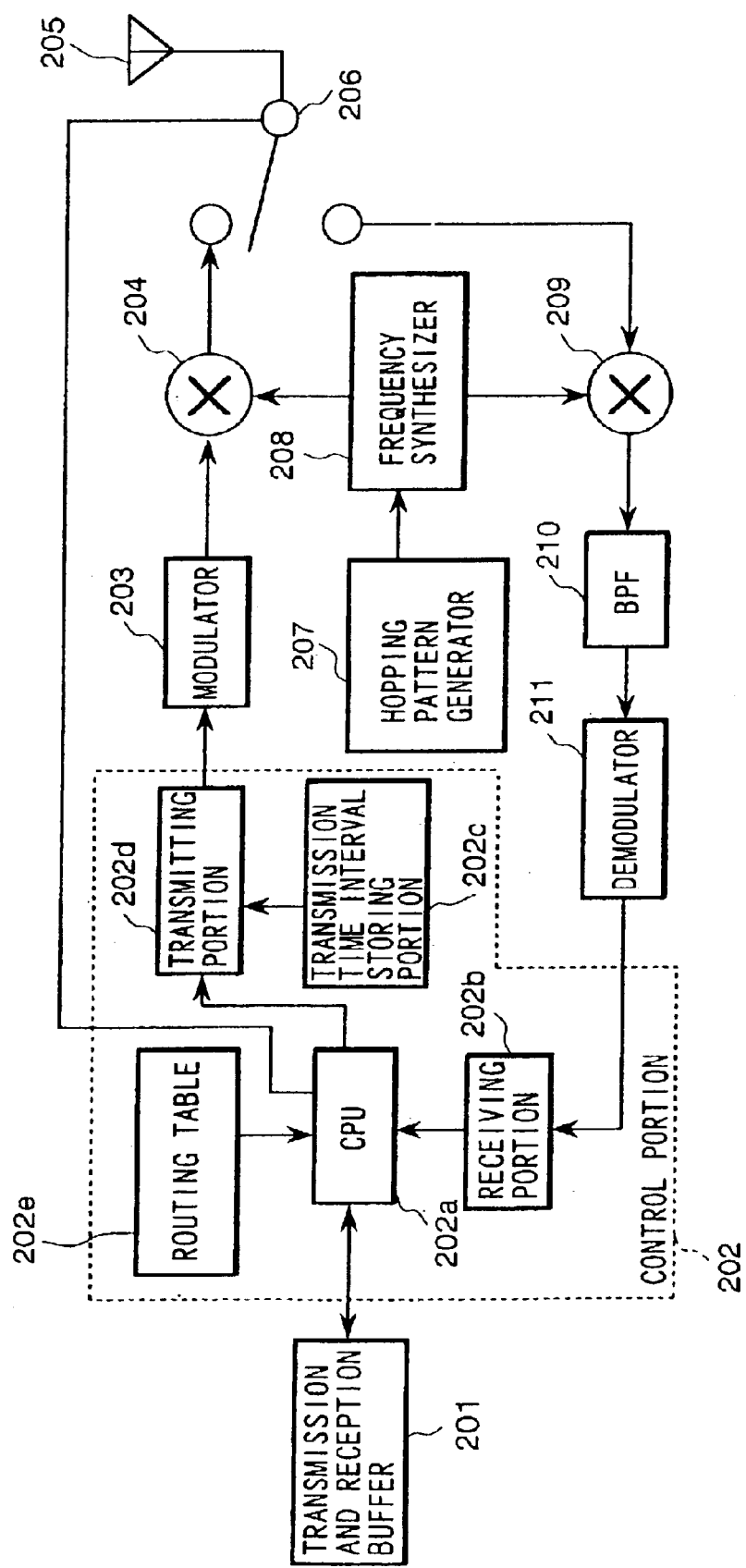
FIG. 1 is a block diagram showing the preferred embodiment of a radio communication control unit to be used in a radio network according to the present invention.

Next, a construction of the radio communication control unit will be discussed with reference to FIG. 1. The radio communication control unit includes a transmission and reception antenna 205, a transmission and reception changeover switch 206, a transmission mixer 204, a modulator 203, a reception mixer 209, a band-pass filter 210, a demodulator 211, a frequency synthesizer 208, a hopping pattern generator 207, a transmission and reception buffer 201 and a control portion 202.

The control portion 202 includes CPU 202a, a receiving portion 202b, a transmission time interval storing portion 202c, a transmitting portion 202d and a routing table 202e.

The transmitting portion 202d reads out data from the transmission and reception buffer 201 via CPU 202a at a time interval stored in the transmission time interval storing portion 202c for form a frame by adding the preamble and CRC to feed to the modulator 203. The modulated frame data is mixed with an output of the frequency synthesizer 206 controlled by the hopping pattern generator 207 in the transmission mixer 204 for frequency conversion. CPU 202a switches the transmission and reception changeover switch 206 to transmission side to transmit data through the transmission and reception antenna. When the transmission and reception changeover switch 206 is switched to the reception side, data received by the transmission and reception antenna 205 is mixed with an output of the frequency synthesizer 208 in the reception mixer 209 for frequency conversion and is demodulated by the demodulator 211 through the band-pass filter 210. The demodulated frame data is transmitted to the receiving portion 202b. The receiving portion 202b checks the preamble and the CRC of the frame to transfer to the transmission and reception buffer 201 via CPU 202a if normal.

CPU 202a monitors data accumulation amount of the transmission and reception buffer 201. If the data accumulation amount in the transmission and reception buffer 201 exceeds a predetermined threshold value, a transmission rate restriction demand is transmitted to the transmitting portion 202d. The transmission rate restriction demand is transmitted to all of the radio transmission and receiving devices and the radio communication terminals by broadcasting address. On the other hand, when data received from the receiving portion 202b is the transmission restriction command, CPU 202a increases the time interval stored in the transmission time interval storing portion 202c to lower transmission rate. On the other hand, the transmission time interval storing portion 202c reduces or shortens the transmission time interval when the transmission rate restriction demand is not received within one transmission time interval to increase transmission rate.

In order to enable transmission of data through the shortest route, the routing table 202e stores route setting information for all of the radio communication terminals.

Figure 3:
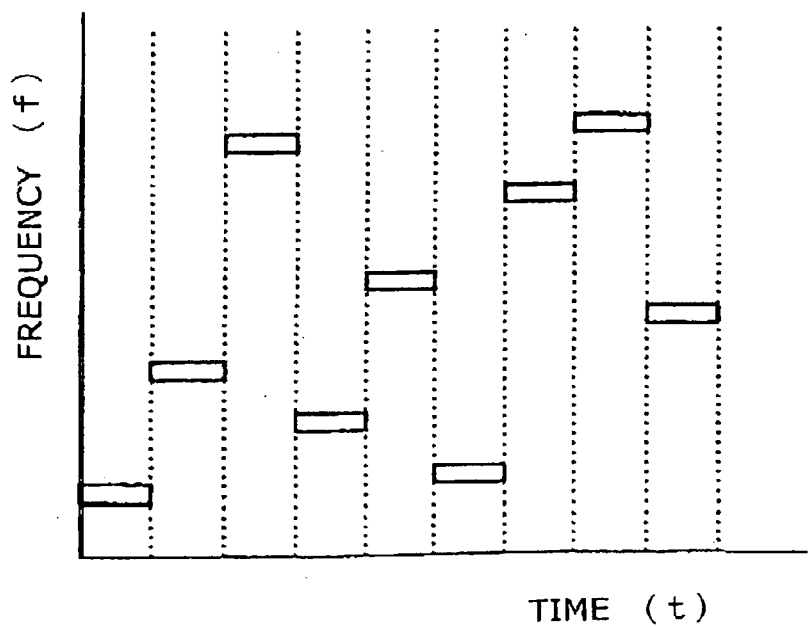
FIG. 3 is a chart showing an example of a frequency hopping pattern to be used in the radio network according to the present invention.

The hopping pattern generators 207 are provided the same hopping pattern in all of the radio communication control units and the radio communication terminals. By this, a system strong against interference of the reflection wave and noise can be established. FIG. 3 shows an example of hopping pattern using a frequency band of 2.4 GHz. This pattern varies transmission frequency between 2.47 GHz to 2.49 GHz at an interval of 10 KHz according to elapse of time.

The radio communication terminal has a construction similar to the radio communication control unit set forth above. However, the routing function and transmission rate restriction demand transmitting function are not included in the radio communication terminal.

Next, discussion will be given for the same where communicating condition is degraded in certain zone in the ring shaped radio network shown in FIG. 2. Now, it is assumed that communicating condition between the radio communication control units 100 and 130b is good, communicating condition between the radio communication control units 100 and 110 is degraded, and communicating condition between the radio communication control unit 100 and the radio communication terminals 107 and 108 located in the communication area of the radio communication control unit 100 is good.

Figure 4:
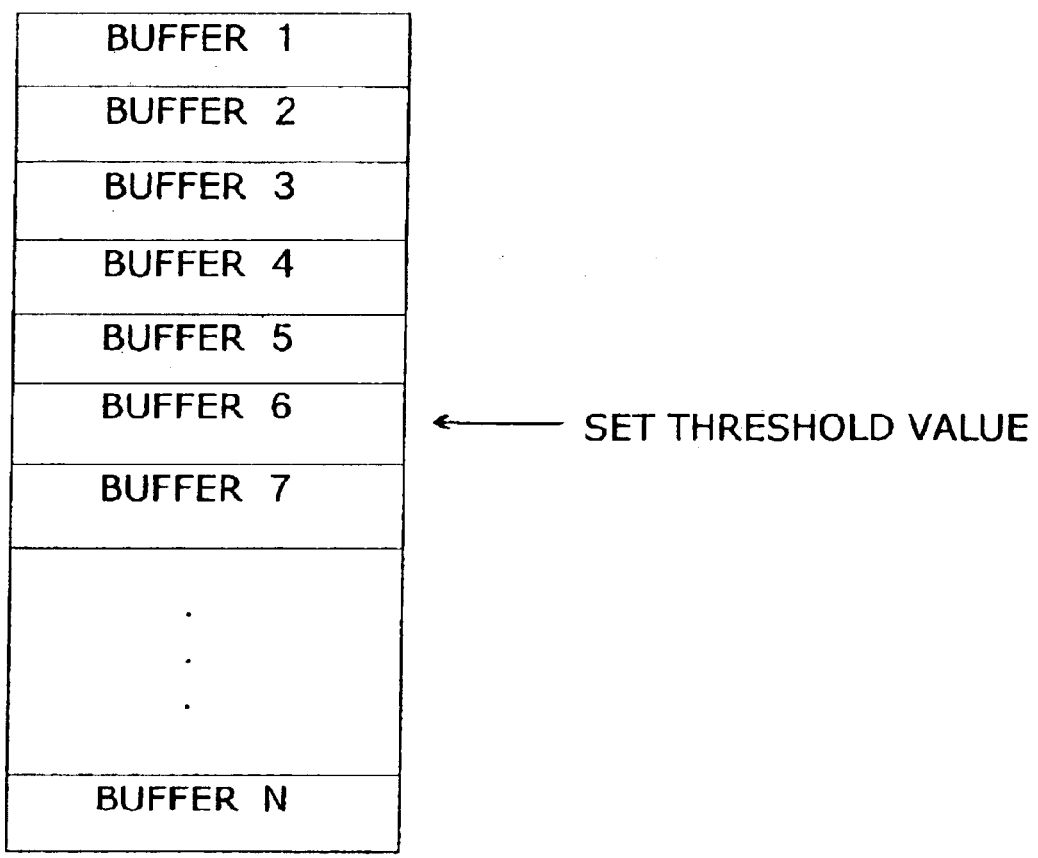
FIG. 4 is an illustration showing a structure of transmission and reception bugger of the radio communication control unit used in the radio network according to the present invention.

It is further assumed that the radio communication terminals 107 and 108 transmit data to the radio communication terminals 117 and 118, and another data addressed to the radio communication terminals 117 and 118 is transmitted from the radio communication control unit 130 to the radio communication control unit 100. These data is temporarily stored in the transmission and reception buffer 201 for relaying of the radio communication control unit 100, which transmission and reception buffer 201 is formed with N in number of buffers as shown in FIG. 4, and subsequently transmitted to the radio communication control unit 110. However, since communicating condition between the radio communication control units 100 and 110 is degraded, re-transmission of data is caused to require longer period for taking out the reception data in the transmission and reception buffer 201 of the radio communication control unit 100. In such condition, in the conventional radio network, large amount of data is accumulated in the transmission and reception buffer to require large capacity buffer. On the other hand, due to large transmission delay, it is possibly cause system failure.

In the radio network according to the present invention, when the data amount stored in the transmission and reception buffer exceeds the predetermined threshold value, the transmission rate restriction demand is broadcasted to all of the radio communication control units and radio communication terminals. As the threshold value, when the transmission and reception buffer is consisted of N in number of buffers, N/2 or N/3 may be set. The transmission rate restriction demand is transmitted every time of transmission of data until the data amount stored in the transmission and reception buffer is reduced to be less than or equal to the threshold value. The transmission rate restriction demand is transmitted to all of the radio communication control units and the radio communication terminals by broadcasting. The radio communication control unit relaying the transmission rate restriction demand relays the transmission rate restriction demand with higher priority than any other data. The threshold value is determined depending upon a buffer capacity and throughput required for the network.

The radio communication control units and the radio communication terminal received the transmission rate restriction demand lower the transmission rate by setting a time interval derived by adding one frame period to the current transmission time interval. On the other hand, when the transmission rate restriction demand is not received until transmission of data, the transmission rate is increased by subtracting one frame period from the current transmission time interval until a predetermined minimum time interval is reached.

As can be clear from the above, if any one of the radio communication control units transmits the transmission rate restriction demand, all of the radio communication control units and the radio communication terminals in the network restrict the transmission rate. On the other hand, when no radio communication control unit transmits the transmission rate restriction demand, all of the radio communication control units and the radio communication terminals in the network increase transmission rate.

With the present invention, in the ratio network, in which the main line is constructed for radio communication, the transmission rate of the overall network can be constantly kept uniform, packet loss can be prevented and high throughput can be realized.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

In the radio network according to the present invention set forth above, by varying reading time interval of the transmission and reception buffer, namely by varying the transmission time interval of data, transmission rate is varied without varying transmission bit rate. However, it should be obvious to those skilled in the art to modify the shown embodiment of to vary the transmission bit rate and/or transmission time interval for varying the transmission rate.

Figure 5:
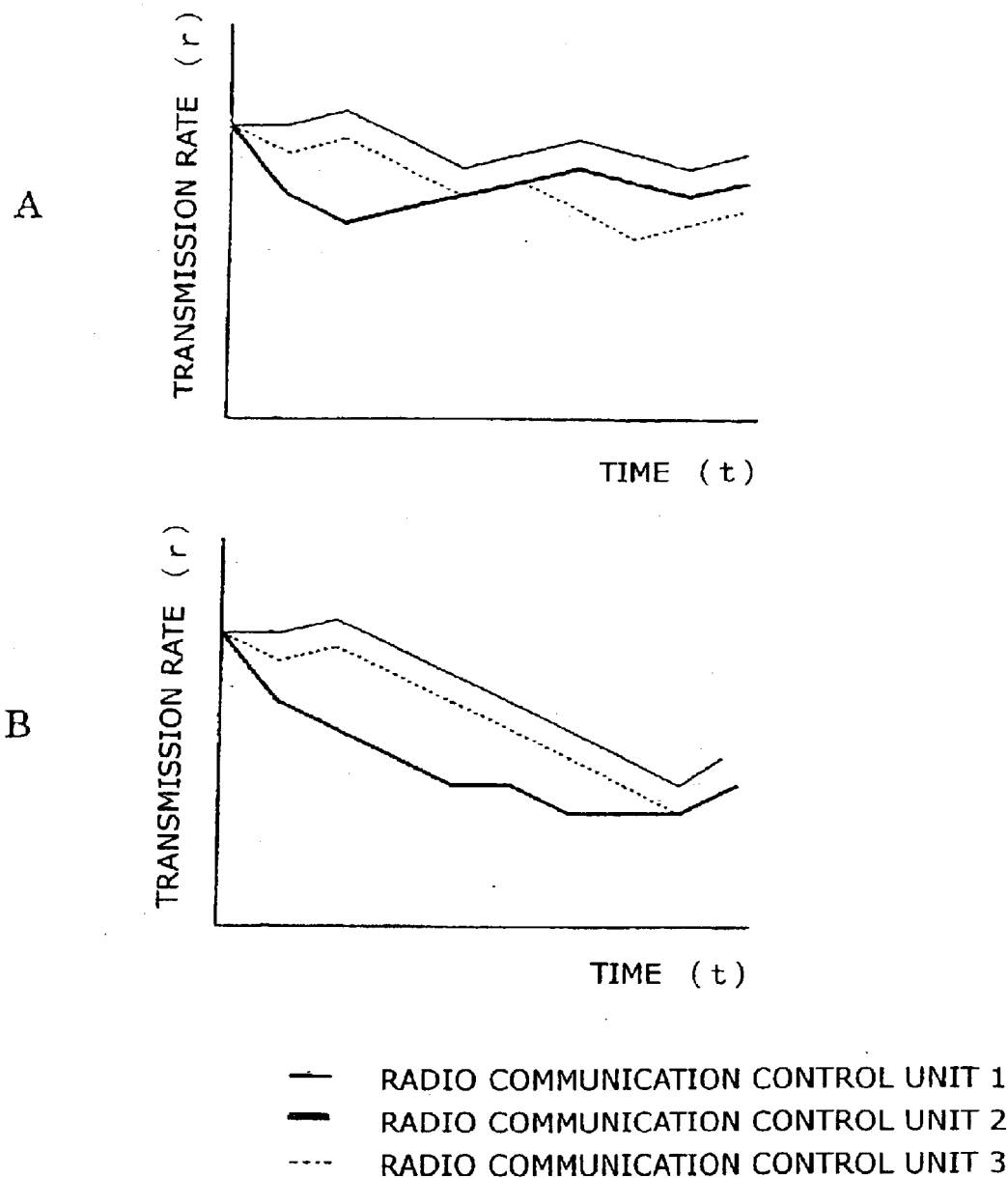
FIG. 5 is a chart for explaining variation of transmission rate in time of the radio communication control unit in the radio network according to the invention.

In the radio network according to the present invention, significant drop of the transmission rate only in a part of the communication zone can be successfully prevented. FIG. 5 is an illustration for explaining this effect of the present invention. In FIG. 5, A shows an example of variation of the transmission rate in the radio communication control units 1 to 3 in time when communicating condition in all zone is good, and B shows an example of variation of the transmission rate in the radio communication control units 1 to 3 in time when communicating condition in a part of communication zone is degraded.

In the radio network according to the present invention, the transmission rate in the overall network can be maintained uniform to keep communication quality and to effectively use communication resource.

What is claimed is:

1. A radio network system comprising:
    a plurality of radio communication terminals;
    a plurality of radio communication control units connected with each other via a radio main line, each radio communication control unit adapted to communicate with at least one radio communication terminal arranged within a communication area of that radio communication control unit, each of said radio communication control units comprising:
    a transmission and reception buffer;
    a processor programmed to initiate a transmission rate restriction demand to all other radio communication control units and all radio communication terminals when a data amount stored in said transmission and reception buffer exceeds a predetermined threshold value; and
    said processor programmed to lower a transmission rate of said radio communication control unit when a transmission rate restriction demand is received from any other radio communication control unit within a predetermined period and to increase the transmission rate when no transmission rate restriction demand is received from any other radio communication control unit.

2. A radio network system as set forth in claim 1, wherein each of said radio communication control units and said radio communication terminals modifies a time interval of reading said transmission and reception buffer for increasing and decreasing said transmission rate.

3. A radio network system as set forth in claim 2 wherein said transmission and reception buffer comprises N separate buffers and a threshold value for lowing said transmission rate is set at N/X, where X is an integer greater than one and less than N.

4. A radio network system as set forth in claim 3 wherein X is equal to 2.

5. A radio network system as set forth in claim 3 wherein X is equal to 3.

6. A radio network system as set forth in claim 1 wherein said plurality of radio communication control units are connected in a ring-shaped network system.

7. A radio network system as set forth in claim 1 wherein each of said radio communication control units and said radio communication terminals has an address.

8. A radio network system as set forth in claim 7 wherein each communication includes a preamble, a destination address, a sender address, data and an error check signal.

9. A method of operating a radio network system which includes:

a plurality of radio communication terminals; and a plurality of radio communication control units connected with each other via a radio main line, each radio communication control unit adapted to communicate with at least one radio communication terminal arranged within a communication area of that radio communication control unit, each of said radio communication control units comprising:

initiating a transmission rate restriction demand to all other radio communication control units and all radio communication terminals when a stored data amount stored exceeds a predetermined threshold value; and lower a transmission rate of said radio communication control unit when a transmission rate restriction demand is received from any other radio communication control unit within a predetermined period and increasing the transmission rate when no transmission rate restriction demand is received from any other radio communication control unit.

10. A method as set forth in claim 9, comprising modifying a time interval of reading data to increase and decrease said transmission rate.

11. A method as set forth in claim 10 comprising defining N separate buffers and setting a threshold value for lowing said transmission rate at N/X, where X is an integer greater than one and less than N.

12. A method as set forth in claim 11 wherein X is equal to 2.

13. A method as set forth in claim 11 wherein X is equal to 3.

14. A method as set forth in claim 10 comprising connecting said plurality of radio communication control units in a ring-shaped network system.

15. A method as set forth in claim 9 wherein each of said radio communication control units and said radio communication terminals has an address.

16. A method as set forth in claim 15 wherein each communication includes a preamble, a destination address, a sender address, data and an error check signal.

17. A radio network system comprising:

a plurality of radio communication terminals;

a plurality of radio communication control units connected with each other via a radio main line, each radio communication control unit adapted to communicate with at least one radio communication terminal arranged within a communication area of that radio communication control unit, each of said radio communication control units comprising:

means for broadcasting a transmission rate restriction demand to all other radio communication control units and all radio communication terminals when data amount stored in a transmission and reception buffer exceeds a predetermined threshold value.

18. A radio network system as set forth in claim 17, wherein each of said radio communication control units further comprises:

means for lowering a transmission rate when a transmission rate restriction demand is received from any other radio communication control unit within a predetermined period and for increasing the transmission rate when no transmission rate restriction demand is received from any other radio communication control unit.

19. A radio network system as set forth in claim 18, wherein each of said radio communication terminals also includes:

a transmission and reception buffer; and means to lower a transmission rate of said radio communication terminal when a transmission rate restriction demand is received from a radio communication control unit within a predetermined period and to increase the transmission rate when no transmission rate restriction demand is received from any other radio communication control unit.

20. A radio network system as set forth in claim 19, wherein said means to lower in each of said radio communication control units and said radio communication terminal modifies a time interval of reading said transmission and reception buffer for increasing and decreasing said transmission rate.

21. A radio network system as set forth in claim 19 wherein said transmission and reception buffer comprises N separate buffers and a threshold value for lowing said transmission rate is set at N/X, where X is an integer greater than one and less than N.

22. A radio network system as set forth in claim 21 wherein X is equal to 2.

23. A radio network system as set forth in claim 21 wherein X is equal to 3.

24. A radio network system as set forth in claim 17 wherein said plurality of radio communication control units are connected in a ring-shaped network system.

25. A radio communication control unit comprising:

a transmission and reception buffer;

a processor programed to initiate a transmission rate restriction demand to a plurality of other radio communication control units when a data amount stored in said transmission and reception buffer exceeds a predetermined threshold value.

26. A radio communication control unit as set forth in claim 25 wherein said processor is programmed to lower a transmission rate of said radio communication control unit when a transmission rate restriction demand is received from another radio communication control unit within a predetermined period and to increase the transmission rate when no transmission rate restriction demand is received from another radio communication control unit.

27. A radio communication control unit as set forth in claim 26, wherein said radio communication control unit modifies a time interval of reading said transmission and reception buffer for increasing and decreasing said transmission rate.

28. A radio communication control unit as set forth in claim 27, wherein said transmission and reception buffer comprises N separate buffers and a threshold value for lowing said transmission rate is set at N/X, where X is an integer greater than one and less than N.

29. A radio communication control unit as set forth in claim 28, wherein X is equal to 2.

30. A radio communication control unit as set forth in claim 29, wherein X is equal to 3.

31. A radio communication terminal comprising:

a transmission and reception buffer;

a processor programmed to lower a transmission rate of said radio communication terminal when a transmission rate restriction demand is received from a radio communication control unit within a predetermined period and to increase the transmission rate when no transmission rate restriction demand is received from a radio communication control unit.

32. A radio communication terminal as set forth in claim 31, wherein said radio communication terminal modifies a time interval of reading said transmission and reception buffer for increasing and decreasing said transmission rate.

33. A radio network system as set forth in claim 32 wherein said transmission and reception buffer comprises N separate buffers and a threshold value for lowing said transmission rate is set at N/X, where X is an integer greater than one and less than N.

34. A radio network system as set forth in claim 33 wherein X is equal to 2.

35. A radio network system as set forth in claim 33 wherein X is equal to 3.

\* \* \* \* \*